US008966058B2

(12) United States Patent
Velaga et al.

(10) Patent No.: US 8,966,058 B2
(45) Date of Patent: Feb. 24, 2015

(54) NETWORK APPLIANCE WITH INTEGRATED LOCAL AREA NETWORK AND STORAGE AREA NETWORK EXTENSION SERVICES

(75) Inventors: Shriram Velaga, Los Altos, CA (US); Samar Sharma, San Jose, CA (US); Chandramouli Radhakrishnan, San Jose, CA (US); Gopinath Durairaj, Palo Alto, CA (US); Bala Nagesh, Mountain View, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 13/040,585

(22) Filed: Mar. 4, 2011

(65) Prior Publication Data

US 2012/0226801 A1 Sep. 6, 2012

(51) Int. Cl.
*G06F 15/173* (2006.01)
*H04L 29/08* (2006.01)
*H04L 29/06* (2006.01)

(52) U.S. Cl.
CPC ......... *H04L 67/1097* (2013.01); *H04L 63/0227* (2013.01)
USPC ........... 709/224; 370/338; 370/229; 370/353; 370/469

(58) Field of Classification Search
CPC ....... G06F 3/067; G06F 3/0605; G06F 21/85; H04L 41/8093; H04L 12/46; H04L 12/4604; H04L 12/4633; H04L 67/1097; H04L 63/0428; H04L 61/2514
USPC .................. 709/224; 370/338, 229, 353, 469
See application file for complete search history.

(56) References Cited

U.S. PATENT DOCUMENTS

| | | | |
|---|---|---|---|
| 8,312,188 B1* | 11/2012 | White et al. ..................... 710/56 |
| 2003/0035397 A1* | 2/2003 | Haller et al. .................. 370/338 |
| 2003/0152182 A1* | 8/2003 | Pai et al. ....................... 375/372 |
| 2006/0182143 A1* | 8/2006 | Lu ................................. 370/469 |
| 2007/0201655 A1* | 8/2007 | Shenfield ................. 379/201.01 |
| 2007/0233893 A1* | 10/2007 | Karpoff ....................... 709/231 |
| 2009/0063696 A1* | 3/2009 | Wang et al. .................. 709/232 |

(Continued)

OTHER PUBLICATIONS

Cisco White Paper: Data Center Interconnect: Layer 2 Extension Between Remote Data Centers, May 2010.
Cisco White Paper: Cisco Delivers Enterprise—Class Next-Generation Acceleration Solution for Disaster Recovery and SAN Extension, Oct. 2009.
Cisco White Paper: "A Day in the Life of a Fibre Channel Frame," Cisco MDS 9000 Family Switch Architecture, Mar. 2006.

(Continued)

*Primary Examiner* — Thuong Nguyen
(74) *Attorney, Agent, or Firm* — Edell, Shapiro & Finnan, LLC

(57) ABSTRACT

Techniques and a network appliance apparatus are provided herein to extend local area networks (LANs) and storage area networks (SANs) beyond a data center while converging the associated local area network and storage area network host layers. A service flow is received at a device in a network. It is determined if the service flow is associated with storage area network or with local area network traffic. In response to determining that the service flow is storage area network traffic, storage area network extension services are performed with respect to the service flow in order to extend the storage area network on behalf of a remote location. In response to determining that the service flow is local area network traffic, local area network extension services are performed with respect to the service flow in order to extend the local area network on behalf of the remote location.

18 Claims, 11 Drawing Sheets

(56) References Cited

U.S. PATENT DOCUMENTS

2011/0110381 A1* 5/2011 Atkinson et al. .............. 370/419
2011/0307659 A1* 12/2011 Hans et al. ................... 711/114

OTHER PUBLICATIONS

Kenji Yoshigoe, Dissertation: "Design and Evaluation of the Combined Input and Crossbar Queued (CICQ) Switch," Aug. 9, 2004.

* cited by examiner

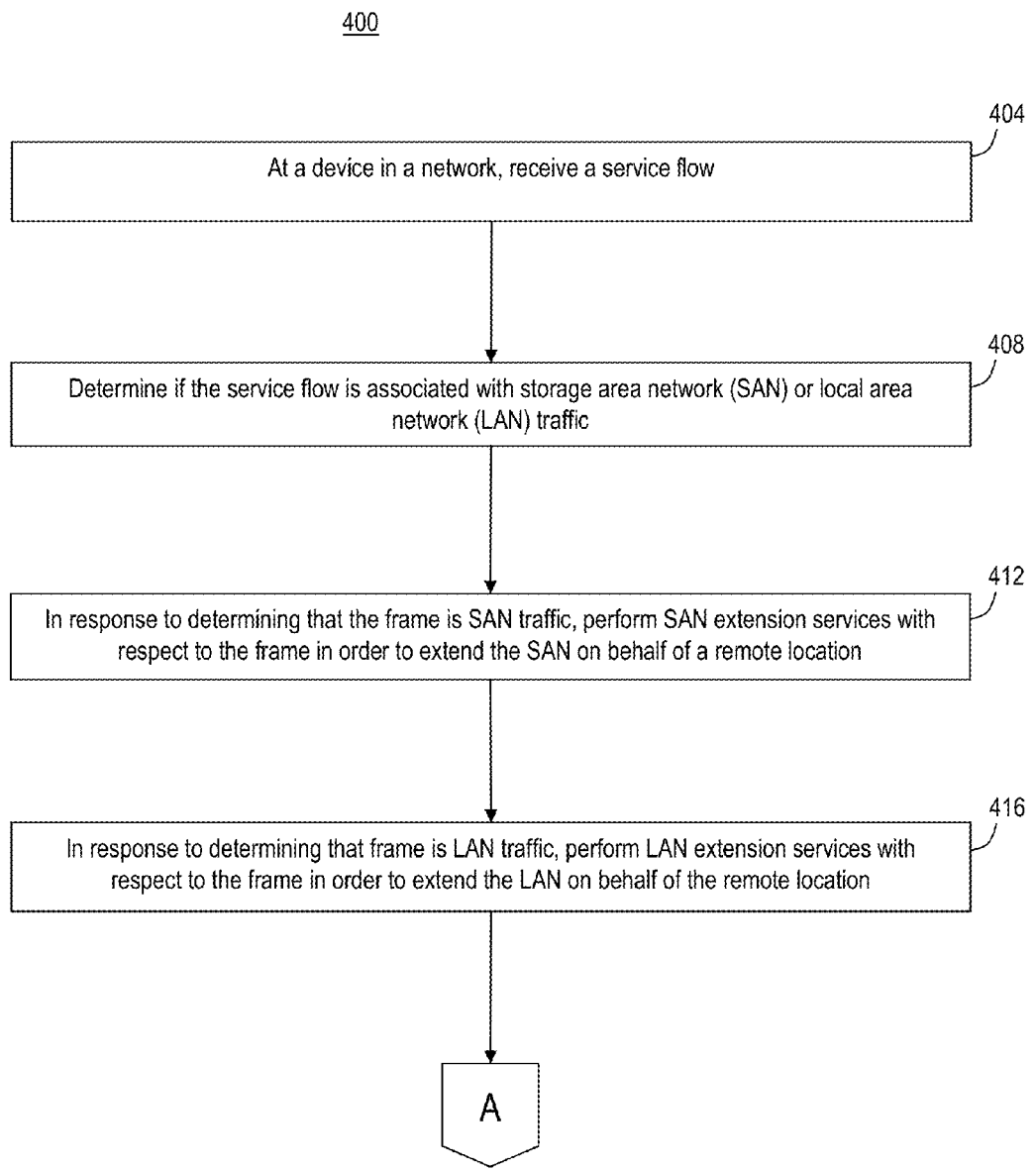

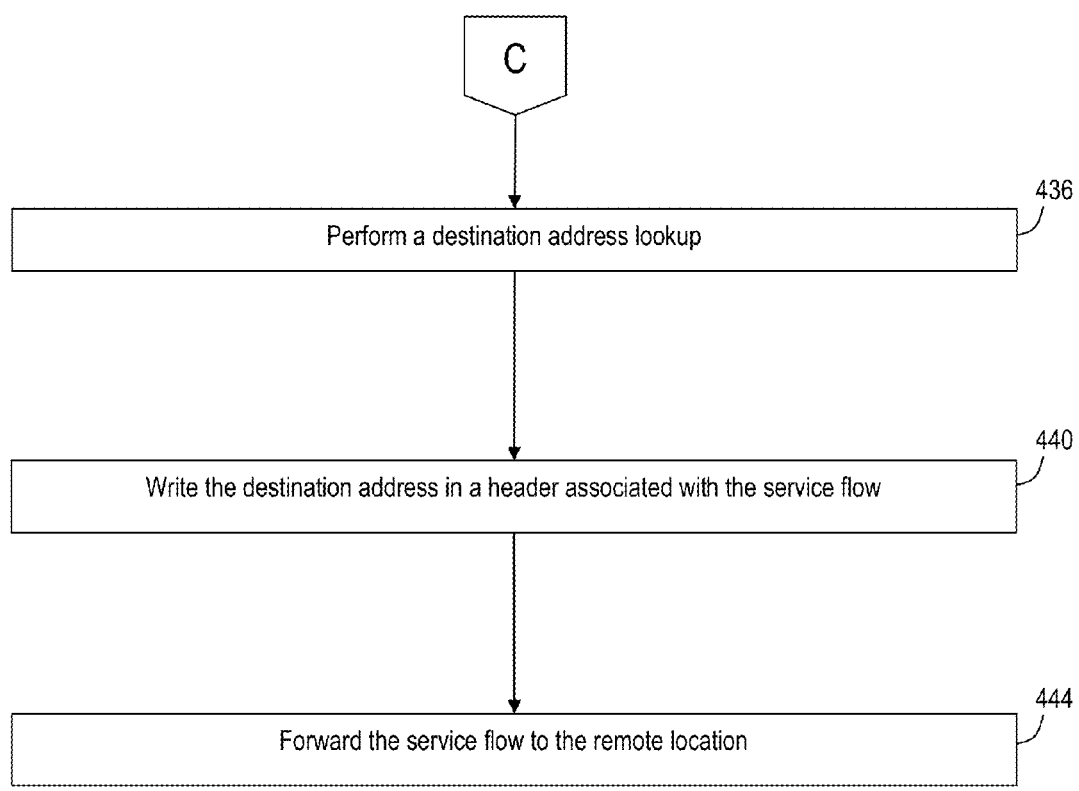

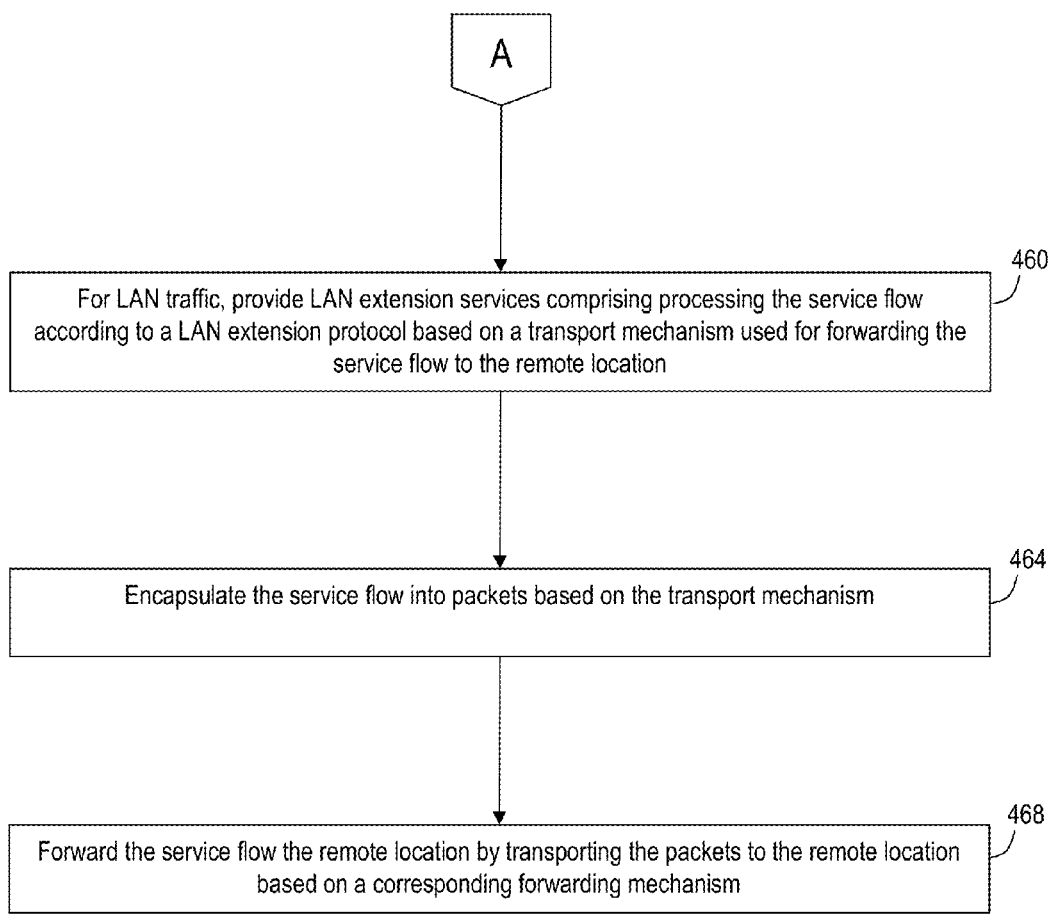

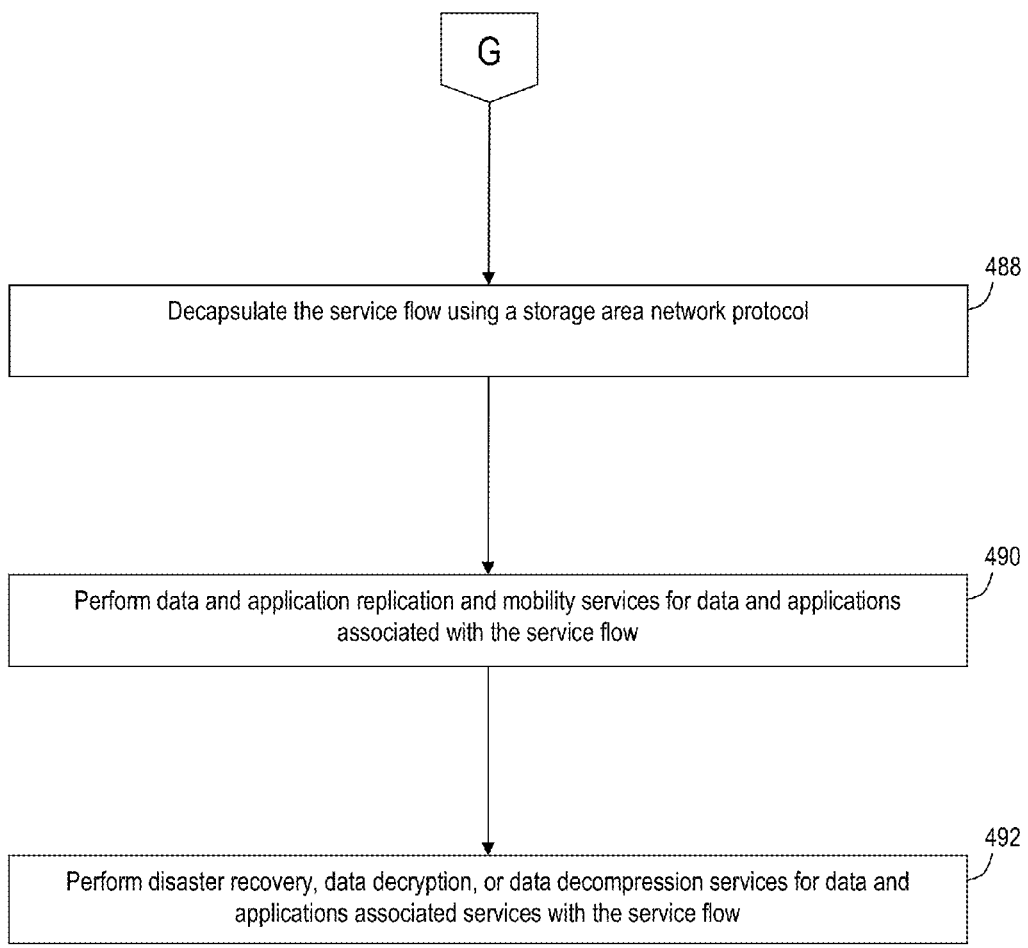

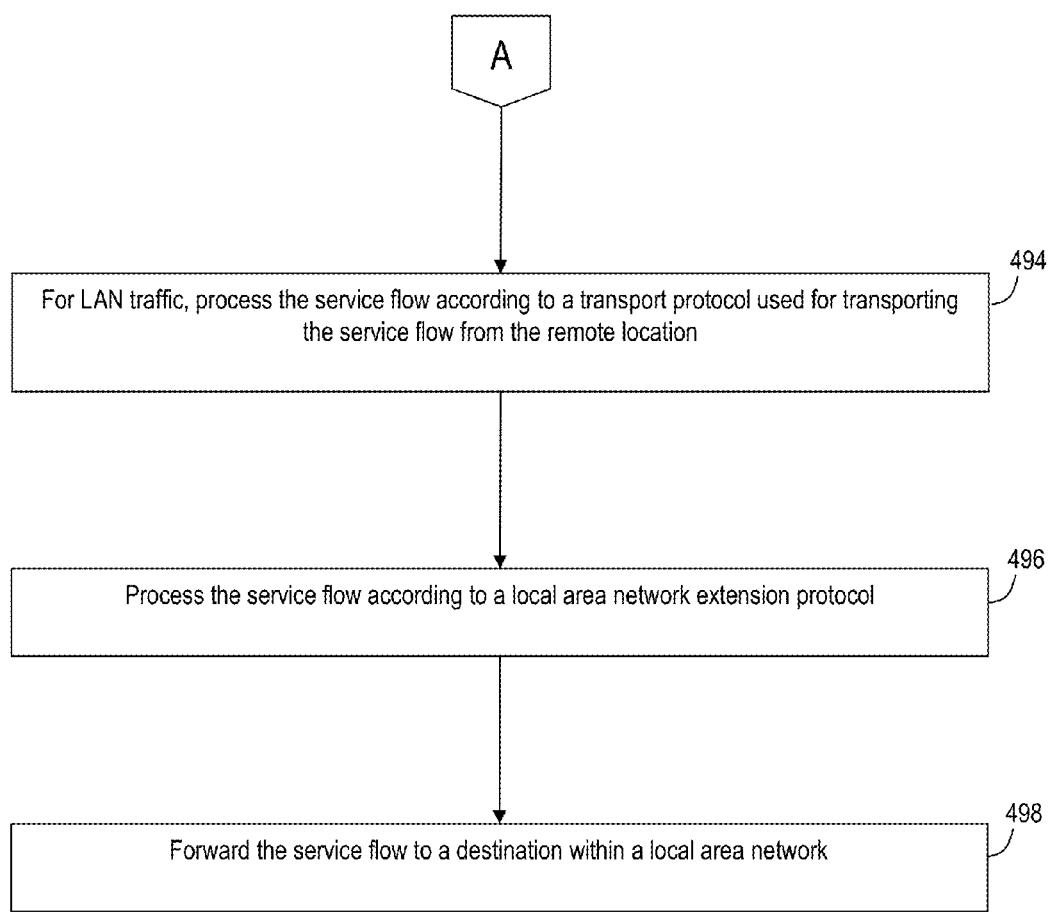

NETWORK APPLIANCE WITH INTEGRATED LOCAL AREA NETWORK AND STORAGE AREA NETWORK EXTENSION SERVICES

TECHNICAL FIELD

The present disclosure relates network devices used in Local Area Networks (LANs) and Storage Area Networks (SANs).

BACKGROUND

Data centers may host applications and store large amounts of data for an organization or multiple organizations. Clusters of storage devices, e.g., Fiber Channel (FC) storage arrays, in one location are called SAN islands and communicate using the FC Protocol. Users accessing a SAN may reside on an Ethernet based LAN at another location that may be coupled to an FC server cluster for communication with the FC storage array. To mediate communication between the FC server cluster and the FC storage array, an FC switch network (also called "switched fabric") is employed.

Recent advances have led to virtualization in SANs and LANs resulting in the creation of Virtual SANs (VSANs) and Virtual (VLANs). VSANs and VLANs remove the physical boundaries of networks and allow a more functional approach. In a virtualized environment, virtual devices can move from one place to another without requiring any physical connectivity changes. In addition to virtualization, web hosting, disaster recovery and redundancy considerations make it desirable to extend LANs and SANs beyond traditional single site operations for which LANs and SANs were originally designed.

BRIEF DESCRIPTION OF THE DRAWINGS

FIGS. 4a-4f collectively represent a flowchart depicting a process for providing both LAN extension and SAN extension beyond a data center by a single edge switch device or network appliance for ingress service flows.

FIGS. 4g-4i, together with FIG. 4a, collectively represent a flowchart depicting a process for providing both LAN extension and SAN extension for egress service flows.

DESCRIPTION OF EXAMPLE EMBODIMENTS

Overview

Techniques and a network appliance apparatus are provided herein to extend local area networks (LANs) and storage area networks (SANs) beyond a data center while converging the associated local area network and storage area network host layers. A service flow is received at a device in a network. The device determines if the service flow is associated with storage area network traffic or with local area network traffic. In response to determining that the service flow is storage area network traffic, storage area network extension services are performed with respect to the service flow in order to extend the storage area network on behalf of a remote location. In response to determining that the service flow is local area network traffic, local area network extension services are performed with respect to the service flow in order to extend the local area network on behalf of the remote location.

Example Embodiments

Figure 1:
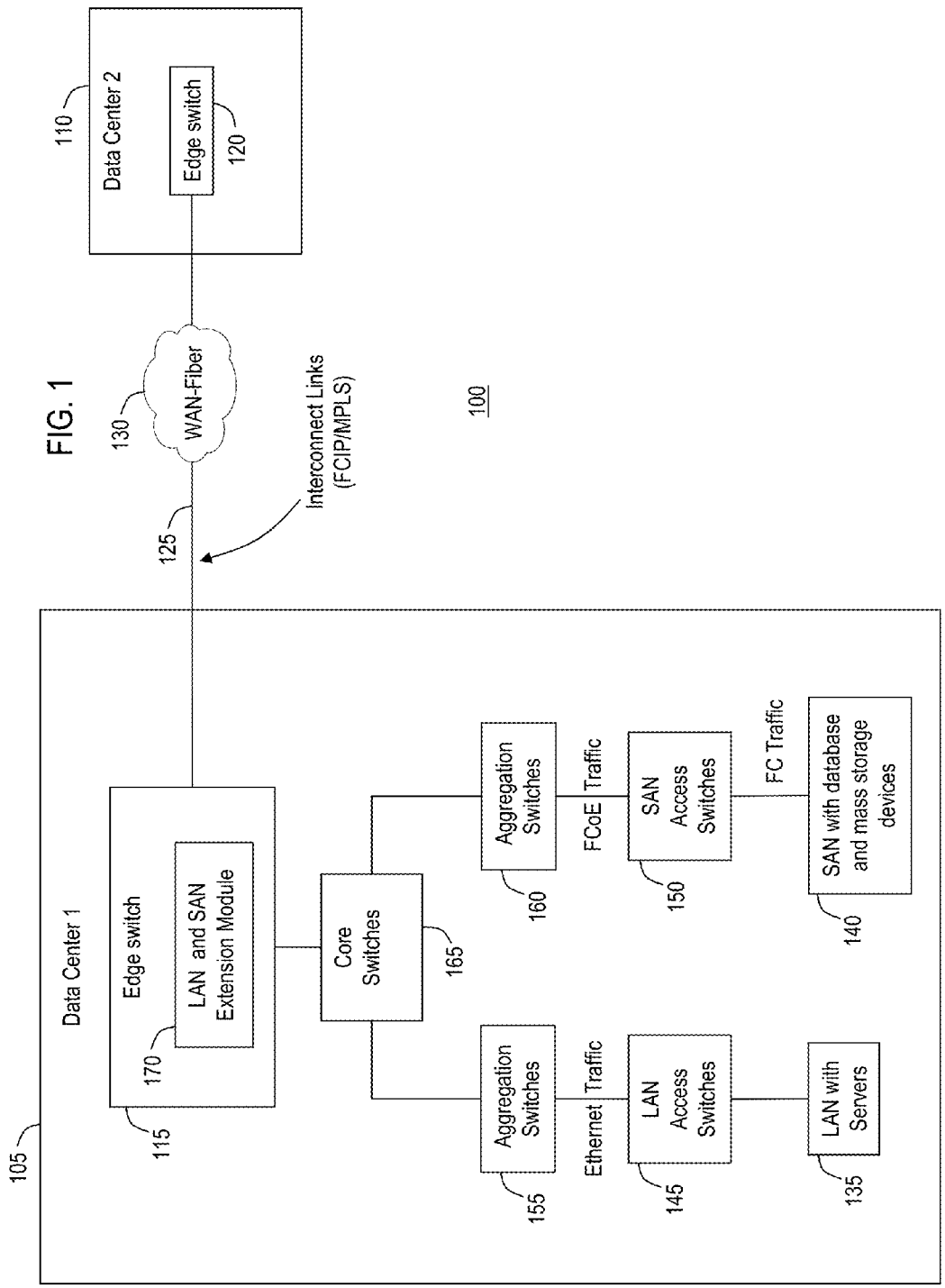
FIG. 1 is an example of a block diagram of a network with two data centers coupled by a Wide Area Network (WAN) with long range fiber optic connections, where an edge switch at one of the data center with integrated SAN and LAN extension capabilities is deployed.

Referring first to FIG. 1, an example system 100 is shown for a multiple data center environment. System 100 comprises a first data center 105 and a second data center 110. The two data centers 105 and 110 communicate with each other using edge switches 115 and 120, respectively, by way of interconnect links 125. The two data centers 105 and 110 may be physically separated by some distance. In this example, the data centers 105 and 110 are separated by Wide Area Network (WAN) 130 that provides long range communication by optical fiber, e.g., via a Coarse Wavelength Division Multiplexing (CWDM) dark fiber or a Dense Wavelength Division Multiplexing (DWDM) color fiber network. The data centers 105 and 110 may also be part of a campus wide network or Metropolitan Area Network (MAN).

Data center 105 is shown in a simplified form and has a LAN 135 and a SAN 140. The LAN 135 may host application services, e.g., World Wide Web server applications or remotely hosted Virtual Machine (VM) applications, while SAN 140 may host database and mass storage services for access by the LAN applications. LAN access is provided by LAN access switches 145 while SAN access is provided by SAN access switches 150. Ingress or upstream traffic from the LAN and SAN is aggregated by aggregation switches 155, and egress or downstream traffic to the LAN and SAN is distributed by core switches 165 and aggregation switches 165 and aggregation switches 155. Similar functionality is provided for SAN traffic by core switches 165 and aggregation switches 160. A plurality of switches is provided at each access, aggregation, and core level to achieve redundancy within the data center 105. Data center 110 may be similarly configured. As used herein, the term "ingress" generally refers to network traffic exiting the LAN or SAN to the WAN 130, while the term "egress" generally refers to network traffic destined for the LAN or SAN.

Typically, LAN and SAN extension may be achieved at the physical layer (Layer 1 of the Open Systems Interconnect (OSI) model) and the data link layer (Layer 2) by adding and configuring extension hardware, and configuring the various switches. This is a cumbersome process and requires a data center operator to configure four separate layers of switches. For LAN extension, transport virtualization is usually configured at the aggregation switches 155 and provides Internet Protocol (IP) encapsulation of Ethernet traffic for IP tunneling over the WAN 130, e.g., using Multiprotocol Label Switching (MPLS). LAN Layer 3 forwarding is configured at the core switches 165 while data center interconnect and Quality of Service (QoS) is provided by edge switch 115.

SAN extension is typically achieved by adding a SAN extension module to the SAN access switches 150. The SAN extension module encapsulates native FC traffic or FC over Ethernet (FCoE) traffic using the FC over IP (FCIP) protocol for transport over WAN 130. SAN traffic received over WAN 130 is decapsulated into FC or FCoE traffic for the SAN 140. Additional SAN extension services may include input/output data compression and acceleration.

According to the techniques described herein, both LAN and SAN extension services are collapsed into a single switch, appliance, or line card, e.g., LAN and SAN extension module 170 residing in edge switch 115. LAN and SAN extension module 170 simplifies data center operations and reduces data center costs. In addition, LAN and SAN extension is provided up to the application layer (Layer 7), thereby converging OSI host layers. Accordingly, typical Layer 1 through Layer 3 LAN and SAN extension is provided at Layers 4 through 7 according to techniques described herein, i.e., LAN and SAN extension services are converged at the host Layers 4-7.

Figure 2:
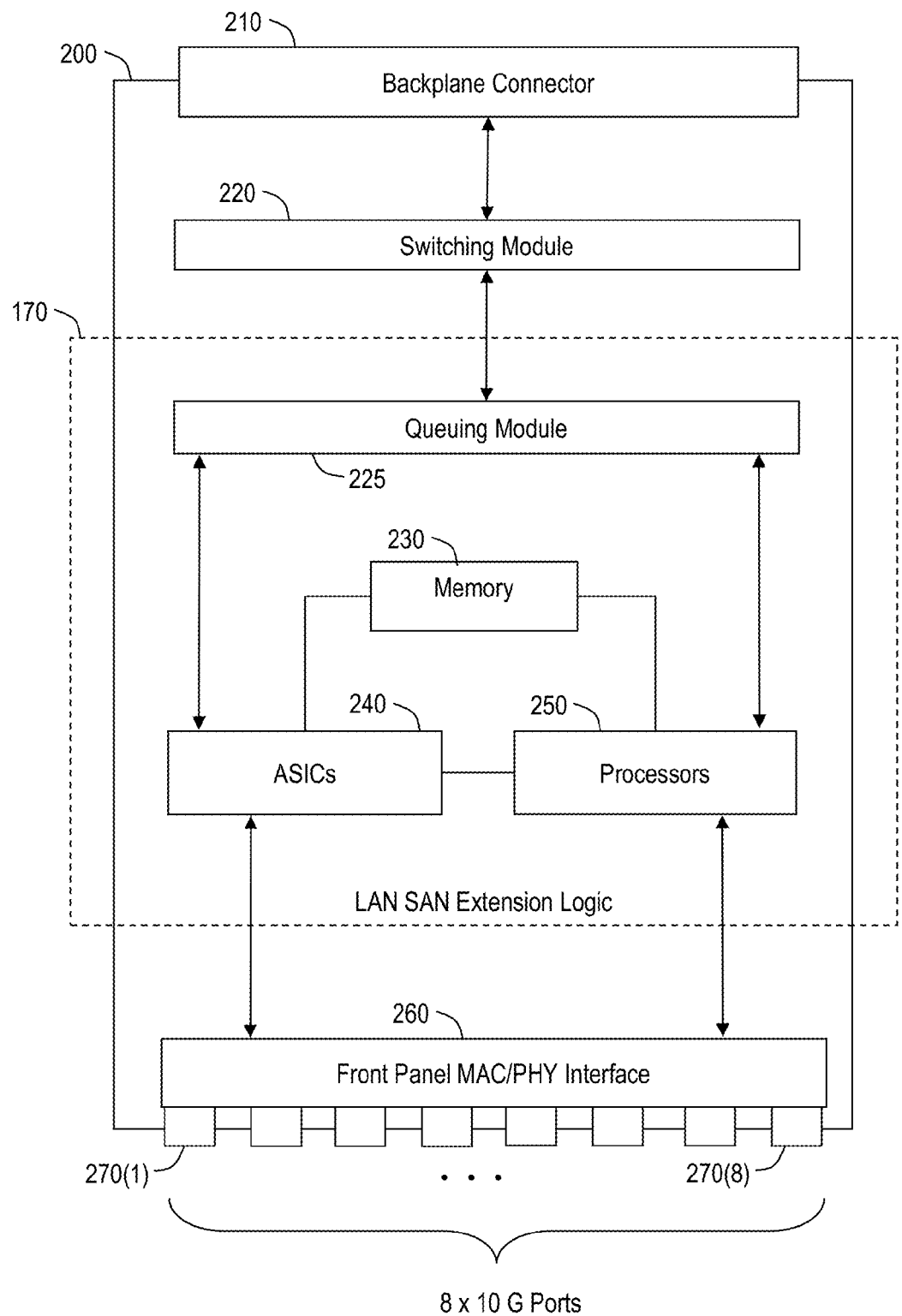
FIG. 2 is an example hardware block diagram of a network device, e.g., edge switch, configured to provide both LAN extension and SAN extension beyond a data center.

Turning now to FIG. 2, an example block diagram of a line card 200 for use in a switch device, e.g., edge switch 115, is shown. The line card 200 comprises a backplane connector 210, a switching module 220, a queuing module 225, a memory 230, one or more Application Specific Integrated Circuits (ASICs) 240, one or more data processing devices 250, a front panel Media Access Control (MAC) and physical layer (PHY) interface 260 that is coupled to a plurality of ports 270(1)-270(8).

The backplane connector 210 is coupled to the backplane of edge switch 115 for sending and receiving traffic to and from other network devices over WAN 130. The switching module 220 performs the basic switching operations for egress and ingress LAN and SAN traffic, and may be implemented by one or more ASICs that may operate in conjunction with processors 250. In this example, the front panel of the line card 200 has eight 10 Gigabit (G) ports 270(1)-270(8) for receiving and transmitting Ethernet or optical signals. The front panel may be designed with other configurations, e.g., the front panel could have two 40 G ports that provide the same capacity as eight 10 G ports.

On ingress, the PHY performs optical to electrical signal conversion, if necessary, and supplies electrical signals to the MAC layer. The MAC layer detects an incoming frame using start of frame and end of frame delimiters. Before forwarding the frame for further processing, the MAC layer may prepend an internal switch header onto the frame that provides the switching module 220 with details such as ingress port, type of port, ingress VSAN/VLAN, frame QoS markings, and a timestamp indicating when the frame entered the switch. The internal switch header is an architectural element that enables multiprotocol and multitransport capabilities of the line card 200. The MAC layer may also check that the received frame contains no errors by validating its cyclic redundancy check (CRC). On egress through the front panel the MAC layer may provide any formatting necessary, drop outdated frames, and add or remove the appropriate header information. The PHY layer then transmits the frames according to the corresponding port configuration for LAN or SAN traffic. The frames are associated with service flows going to and from the LAN or SAN.

The LAN and SAN extension module 170 from FIG. 1 is shown as a dashed line around queuing module 225, memory 230, ASICs 240, and data processors 250, to indicate that LAN and SAN extension is enabled through these data processing components. The data processors 250 may be, for example, microprocessors, microcontrollers, or specialized network processors, e.g., the Octeon II manufactured by Cavium Networks or the MPC8xxx series manufactured by Freescale Semiconductor. The data processing devices 250 may also be referred to herein simply as a processor and may also be a general purpose processor or controller, or a combination of specialized and general purpose processors.

The memory 230 may be any form of random access memory (RAM), FLASH memory, disk storage, or other tangible (non-transitory) memory media device that stores data used for the techniques described herein. The memory 230 may be separate or part of the processor 250. Instructions for performing LAN and SAN extension features may be stored in the memory 230 for execution by the processor 250 such that when executed by the processor, causes the processor to perform the operations described herein in connection with FIGS. 3 and 4a-4i. It should be understood that any of the devices shown in data center 105 may be configured with a similar hardware or software configuration as line card 200.

The functions of the processor 250 may be implemented by a processor or computer readable tangible (non-transitory) medium (e.g., a memory device) encoded with instructions or by logic encoded in one or more tangible media, e.g., digital signal processor (DSP) instructions, software that is executed by a processor, etc. Part of the LAN and SAN extension logic may be implemented by ASICs 240, systems on a chip (SOCs), or other fixed or programmable logic (e.g., software or computer instructions executed by a processor or field programmable gate array (FPGA), wherein the memory 230 stores data used for the computations or functions described herein (and/or to store software or processor instructions that are executed to carry out the computations or functions described herein). Thus, functions of the LAN and SAN extension module 170 may be implemented with fixed logic or programmable logic.

The queuing module 225 performs the QoS queuing operations for egress and ingress LAN and SAN traffic, and may be implemented by one or more ASICs that may operate in conjunction with processors 250. In addition, the queuing module 225 may be used to provide QoS queuing without involving the processors 250. The queuing module 225 may be coupled to processors 250 or be implemented as part of processors 250. Thus, the queuing module 225 facilitates network communications according to a QoS service model, e.g., to provide hierarchical QoS for traffic exchanged over the WAN 130.

Figure 3:
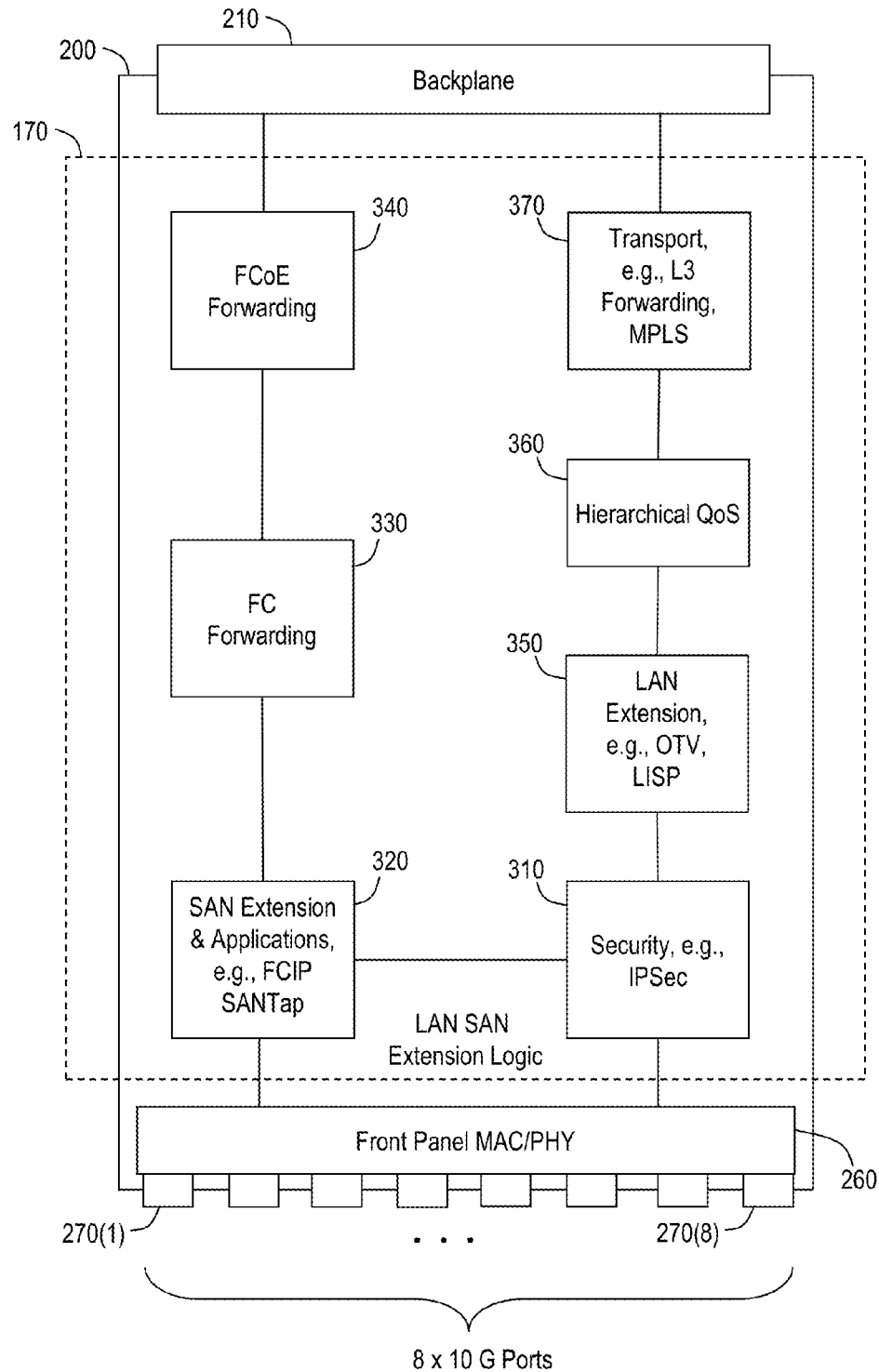
FIG. 3 is an example functional block diagram illustrating the functions performed by the device shown in FIG. 2.

Referring to FIG. 3, a functional or logical block diagram similar to the hardware block diagram of line card 200 of FIG. 2 is shown in which the hardware and software elements of LAN and SAN extension module 170 are broken down into functional or logical components. The functions of backplane connector 210, front panel MAC/PHY 260, and front panel ports 270(1)-270(8) are essentially the same in FIG. 3. The connections between the hardware blocks and logical blocks shown in FIGS. 2 and 3, respectively, are made via known connection methods, e.g., XFI and XAUI traffic lanes, and may also be made via other traffic distribution schemes available now or in the future. Other components may also be used for traffic connectivity within the line card 200, e.g., Serializer/Deserializers (SerDes).

The functional blocks of the LAN and SAN extension module 170 include a security module 310, a SAN extension and applications module 320, an FC forwarding module 330, an FCoE forwarding module 340, a LAN extension module 350, a hierarchical QoS module 360, and a transport module 370. In general, the blocks on the left hand side of the diagram are for SAN extension and the blocks on the right hand side of the diagram are for LAN extension. Functionality for switching module 220 has been omitted.

The security module 310 provides security in the form of encryption for both SAN and LAN traffic. The security module 310 first classifies ingress packets based on configured data center policy. The packets may be encrypted, dropped, or sent in the clear. A complete inline IP Security (IPSec) protocol stack is maintained for encrypting both IP packets for LAN extension and FCIP packets for SAN extension. For packet egress to the LAN or SAN, the packets may be decrypted if previously encrypted and sent to the respective LAN or SAN.

The SAN extension module 320 provides the tools to deploy SAN extension and the corresponding services. SAN extension may provide data and application mobility between data centers, e.g., VM data and application mobility for a particular user, and data replication for data storage at multiple data centers in order to provide backup data sources and data validation. When the WAN, e.g., WAN 130, supports IP traffic, any FC or FCoE frames are encapsulated into FCIP. In addition, SAN extension module 320 facilitates data transfer by providing data compression services in order to accelerate the flow of data. Additional services may include one or more of data replication, disaster recovery, snapshots, e.g., any-point-in-time copies, remote replication I/O Acceleration, data throughput acceleration, data encryption and decryption, data compression, and remote connectivity, e.g., Overlay Transport Virtualization (OTV) protocol encapsulation.

For FC forwarding, FC forwarding module 330 determines which output port on the edge switch, e.g., edge switch 115 from FIG. 1, over which the ingress frame is sent. When a frame is received by the FC forwarding module 330, multiple simultaneous lookups may be initiated. First, a per-VSAN forwarding table lookup is performed based on an associated VSAN and a destination address. The result from the first lookup informs the FC forwarding module 330 of the forwarding port based on the receiving port, associated VSAN, and destination address within the FC frame. The first lookup also indicates whether there is a requirement for any Inter-VSAN Routing (IVR). If the lookup fails, the frame is dropped due to a lack of a forwarding destination.

The second lookup is a statistics based lookup. The switch uses the second lookup (and associated database updates) to maintain a series of statistics about endpoint device and inter-device communication. The statistics that are maintained may include frame and byte counters from a given source to a given destination. The third lookup is a per-VSAN ingress Access Control List (ACL) lookup by VSAN, source address, destination address, ingress port, and a variety of other data fields from an inter-switch header and corresponding FC frame header. The switch uses the result from the third lookup to either permit the frame to be forwarded, drop the frame, or perform any additional inspection on the frame, e.g., to enforce access to hard FC zones that are implemented to logically group SAN components.

If the frame has multiple possible forwarding ports, for example, if there are multiple equal-cost Fabric Shortest Path First (FSPF) routes or the destination is a port channel bundle, a load-balancing decision is made to choose a single physical egress interface from a set of interfaces. The load-balancing policy (and algorithm) can be configured on a per-VSAN basis to be either a hash of the source and destination addresses (SA_ID, DA_ID) or a hash also based on the Originator Exchange Identifier (OX_ID) of the frame. In this manner, all frames within the same flow (either between a single source to a single destination or within a single Small Computer System Interface (SCSI) I/O operation) will always be forwarded on the same physical path, guaranteeing in-order delivery. If traffic from a given source address to a given destination address is marked for IVR, then the final forwarding step is to rewrite the VSAN ID and optionally the source and destination addresses of the frame.

On egress to the SAN, the FC forwarding module 330 has signaled that there is output buffer space available for receiving frames, e.g., frames received over the WAN 130. When a frame arrives at the FC forwarding module 330, e.g., from the switching module 220, the first processing step is to validate that the frame is error free and has a valid CRC. If the frame is valid, the egress forwarding module will issue an ACL table lookup to see if the frame should be permitted or denied access to its destination. ACL rules applied on egress may include, among other items, Logical Unit Number (LUN) zoning and read-only zoning ACL rules. The next processing step is to finalize any FC frame header rewrites associated with IVR or FC network address translation (NAT). Finally, the frame is queued for transmission to the destination port MAC with queuing on a Class of Service (CoS) basis, e.g., the frame may be matched to an egress queue based on deficit-weighted round robin (DWRR) queuing and configured QoS policy map.

For FCoE forwarding, FCoE forwarding module 340 performs similar functions as FC forwarding module 330 when the FC frames are encapsulated as Ethernet frames (FCoE), e.g., DA_ID lookups and rewrites as necessary. The functionality of both the FC forwarding module 330 and the FCoE forwarding module 340 with respect to both ingress and egress traffic may be implemented in ASICs, although other forms of processing may be employed as described above.

Turning to the right hand side of FIG. 3, the LAN extension module 350 performs LAN extension services for LAN traffic. Locally generated (ingress) LAN traffic is prepared for transport over the WAN 130 using a LAN extension protocol such as Location/Identifier Separation Protocol (LISP) or OTV. LISP or OTV traffic is typically tunneled using IP version 4 (IPv4), IPv6, or MPLS packets depending on the transport mechanisms available over WAN 130, although other protocols may be used. Thus, the LISP and OTV protocols provide data center interconnect capability by way of WAN 130. LAN extension module 350 may be implemented using ASICs with the aid of database lookups. Additional processing may be provided by a general purpose processor for more complex LAN extension protocols.

Entities within a LAN are generally isolated to a local area. Entities within the LAN talk to each other without any provisioning because each entity performs auto learning of the presence and absence of other LAN entities. When entities in different LANs need to talk to each other, they are typically connected by another networking technology mainly IP routing. IP routing does require some provisioning in the network. Applications like VM mobility or server clustering expect functionalities within a LAN even when the entities are actually spread across multiple LANs. The typical case is when the entities are in isolated LANs but are connected thru a WAN, e.g., the Internet, Layer 3 Virtual Private Networks (VPNs), etc.). LAN extension is a technology allows these isolated LAN entities to talk to each other by treating the underlying network as a single LAN.

Hierarchical QoS module 360 performs one or more of traffic classification, traffic metering, traffic marking, congestion management, and traffic conditioning functionality in a hierarchical manner for LAN traffic. The hierarchy applies different various traffic controls at various traffic levels or layers. For example, several sessions or classes may be attached to a virtual or logical port/interface, and several logical ports may be tied to a physical port. QoS policies may be applied at each of the session or class, logical port, and physical port levels.

On egress, session traffic may be classified according a CoS which may have assigned bandwidth limits, traffic priority, and traffic shaping attributes that eventually affect how the LAN traffic gets queued for output. At the logical port level, the logical ports may be over subscribed with respect to the physical port, i.e., the sum of the bandwidth assigned to the logical ports exceeds the bandwidth that the physical port can actually transmit. Accordingly, traffic may be back pressured or slowed down at the logical port level according to the QoS policy. For egress traffic, similar types of QoS features may be applied to traffic destined for the LAN. The above description of the hierarchical QoS module 360 has been simplified for ease of illustration and is not intended to be limiting.

The transport module 370 provides IPv4, IPv6, or MPLS encapsulation of packet for transport over the WAN 130. The transport module 370 also provides Layer 2/Layer 3 forwarding of LAN traffic, e.g., forwarding at the IP layer. This module may be implemented via an ASIC along with a storage medium. Example transport module 370 functions include packet header lookups, destination lookup, and encapsulating, decapsulating and rewriting the packet headers. Transport module 370 may support the following additional functions: Layer 2 Ethernet switching, IPv4 unicast/multicast forwarding, IPv6 unicast/multicast forwarding, MPLS forwarding for Layer 2 and Layer 3 VPNs, IP based Layer 3 VPNs that include Generic Routing Encapsulation (GRE) tunneling, policy based forwarding, dynamic flow based forwarding, policy based security ACLs, policy based QoS policing and marking, and dynamic flow based QoS policing and marking.

Referring now to FIGS. 4a, 4b, 4c, 4d, 4e, and 4f, and with continued reference to FIG. 3, an example of a flowchart is shown that generally depicts a LAN and SAN extension process for ingress service flows. The LAN and SAN extension process is identified at reference numeral 400, and will be referred to hereinafter as LAN and SAN extension process 400 or simply as process 400. Although LAN and SAN extension process 400 is described as a process, the various features may be implemented as hardware logic or software that implements a process or parts thereof.

LAN and SAN extension process 400 begins at 404, where at a device in a network, a service flow in the form of digital data is received. The device may be a line card or a single network appliance, e.g., a switch or a router, that is configured to implement LAN and SAN extension process 400 as part of a single unit. At 408, the service flow is analyzed to determine if the service flow is associated with SAN traffic or LAN traffic. At 412, if the service flow is SAN traffic then SAN extension services are performed in order to extend the SAN to a remote location. The SAN extension services may be performed by SAN extension module 320 shown in FIG. 3. At 416, if the service flow is LAN traffic, then LAN extension services are performed in order to extend the LAN to a remote location. The LAN extension services may be performed by LAN extension module 350 shown in FIG. 3.

Figure 4B:
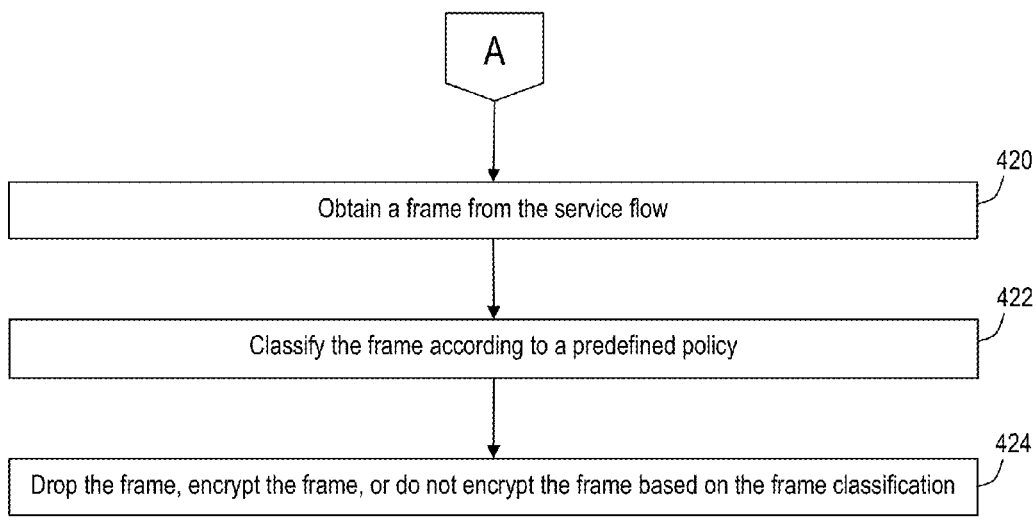
Figure 4C:
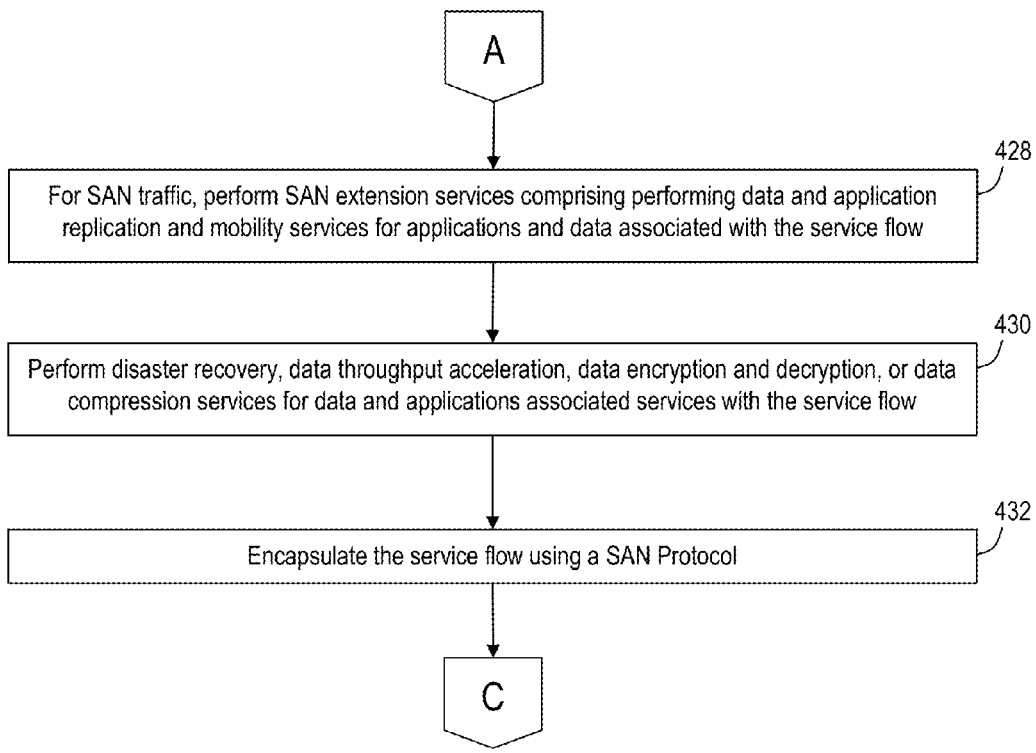
Figure 4F:
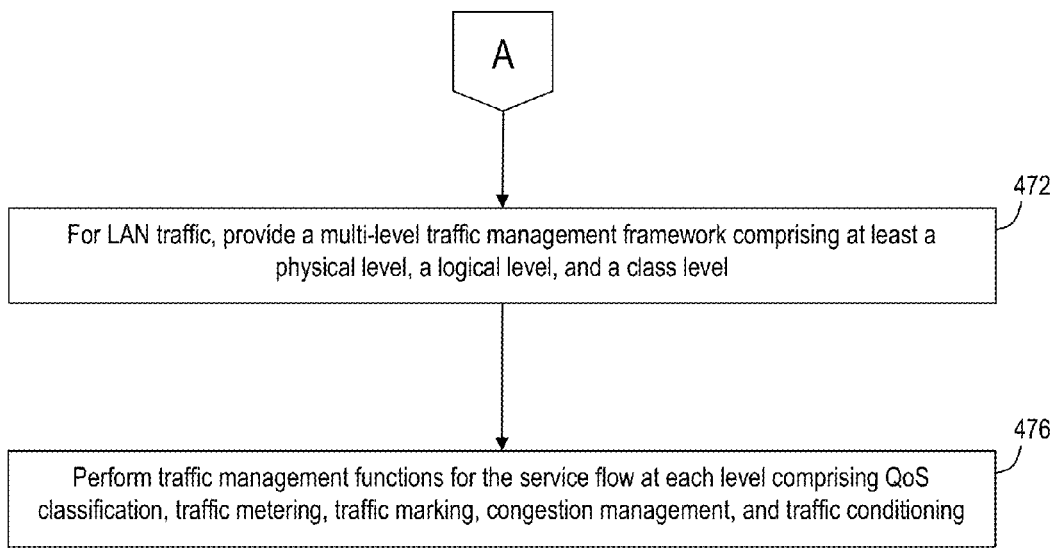
Figure 4G:
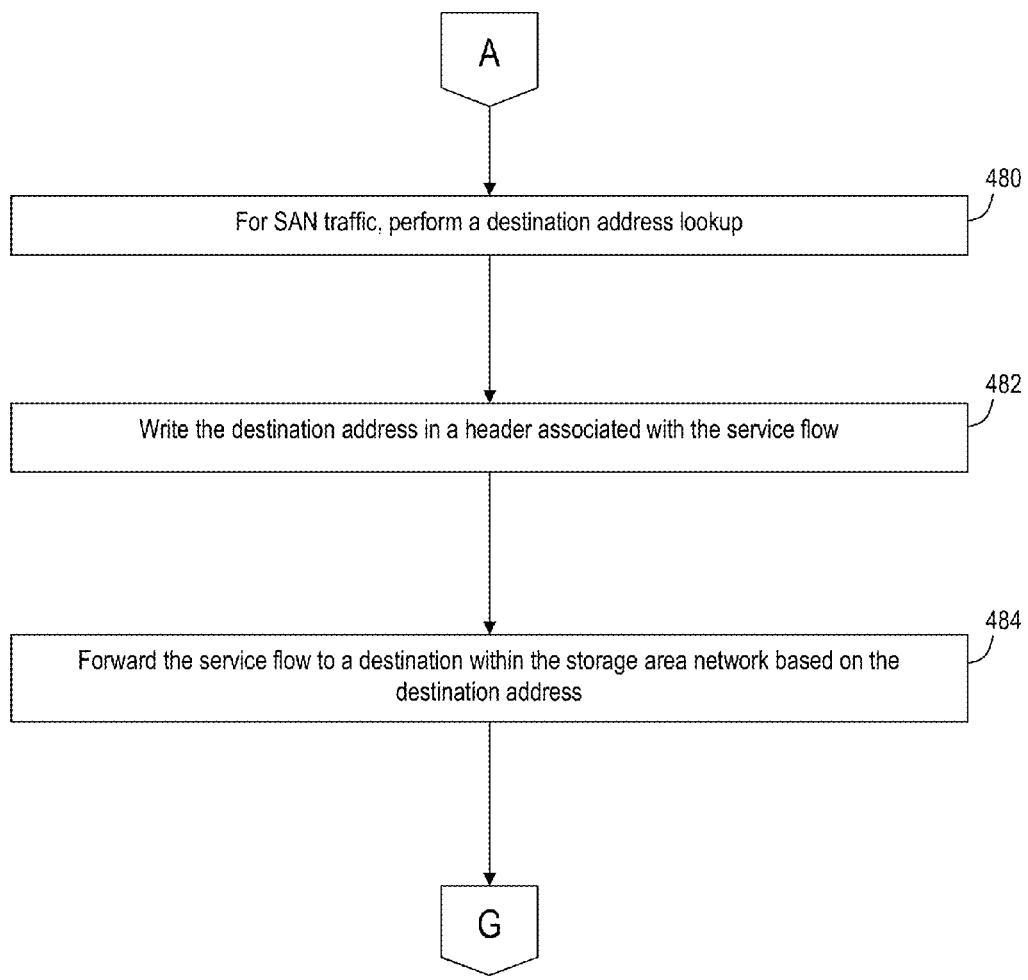

The flowchart shown in FIG. 4b continues from FIG. 4a and depicts a process for frame processing. Flowcharts shown in FIGS. 4b, 4c, 4e, 4f, 4g and 4i branch from FIG. 4a and continue at off-page connector A. Flowcharts shown in FIGS. 4d and 4h branch and continue from FIGS. 4c and 4g, respectively. FIGS. 4c and 4d are associated with SAN extension services for ingress service flows, and FIGS. 4g and 4h are associated with SAN extension services for egress service flows. FIGS. 4e and 4f are associated with LAN extension services for ingress service flows while FIG. 4i is associated with LAN extension services for egress service flows. FIG. 4a applies to both ingress and egress service flows.

Referring to FIG. 4b, at 420, a frame is obtained from the service flow. The frame may be obtained by correlating start of frame (SOF) and end of frame (EOF) delimiters within the digital data stream. At 422, the frame is classified according to a predefined policy. Both SAN and LAN frames are classified, e.g., based on source address (SA), destination address (DA), or protocol. As an example for a Transport Control Protocol (TCP) flow with the following 5-tuple: SrcIP, DestIP, Src Port, TCP port, TCP protocol, data in the TCP flow is classified based on the 5-tuple. At 424, based on the frame classification, the frame is dropped, encrypted, or forwarded in the clear.

Referring to FIG. 4c, the process continues from FIG. 4a for SAN traffic. At 428, SAN extension services are provided for SAN service flows. The services may include data and application replication and mobility services for data and applications associated with the frame. In addition, data compression and acceleration services may be provided. At 430, additional services may be performed that include one or more of performing disaster recovery, data throughput acceleration, data encryption and decryption, and data compression services for data and applications associated services with the service flow. At 432, the service flow is encapsulated using SAN protocol, e.g., FCIP when the service flow is to be forwarded over an IP network. Other example protocols include Internet Small Computer System Interface (iSCSI) and Internet Fiber Channel Protocol (iFCP).

Turning now to FIG. 4d, the process continues from FIG. 4c for SAN service flows. At 436, a destination address lookup is performed. At 440, the destination address is written in a header associated with the service flow, and at 444, the service flow is forwarded to the remote location.

Referring to FIG. 4e, the process continues from FIG. 4a for LAN traffic. At 460, for LAN traffic, LAN extension services are provided that extend the LAN, e.g., that extend local data center LAN communication to a remote data center. The LAN extension services may comprise processing the service flow according to a LAN extension protocol based on a transport mechanism used for forwarding the service flow to the remote location. At 464, the frame is encapsulated into packets, e.g., IP or MPLS packets, based on the transport mechanism. At 468, the service flow is forwarded to the remote location by transporting the IP or MPLS packets to the remote location based on a corresponding forwarding mechanism.

Referring to FIG. 4f, QoS processing for LAN traffic is described. At 472, a multi-level traffic management framework is provided that comprises at least a physical level, a logical level, and a class level, i.e., a form of Hierarchical QoS (H-QoS). At 476, traffic management functions are performed for the service flow at each level comprising one or more of QoS classification, traffic metering, traffic marking, congestion management, and traffic conditioning.

H-QoS generally refers to the action of implementing granular QoS policies in a hierarchical manner. The QoS results of one layer in the hierarchy are passed on to the next QoS layer. The processing typically starts from the root of the hierarchy and is propagated to all nodes to achieve the final end result. H-QoS allows a user to create virtual layers in QoS processing to utilize the network resources in a more granular fashion. As an example, if there are N subscribers attached to a physical network port and each subscribing to three classes of service, e.g., television, Internet, and IP-phone, an H-QoS policy allows the user to partition his physical interface into N logical interfaces with three classes of service. Then the user is allowed to configure certain QoS criteria based on subscriber and then based on class of service. For example subscriber A is preferred over subscriber B. However, since IP-phone service is preferred over any other service, B's IP-phone service may be granted higher QoS than A's Internet service.

Turning to FIGS. 4g, 4h, and 4i, and with continued reference to FIG. 3, an example of a flowchart is shown that generally depicts a LAN and SAN extension process for egress service flows. For egress service flows, the service flow was forwarded from the remote location. Referring to FIG. 4g, LAN and SAN extension process 400 continues from FIG. 4a with respect to SAN traffic received from the remote location. At 480, performing storage area network extension services comprises performing a destination address lookup. At 482, the destination address is written in a frame header associated with the service flow. At 484, the service flow is forwarded to a destination within the storage area network based on the destination address.

Referring to FIG. 4h, the process 400 continues from FIG. 4g. At 488, the service flow is decapsulated using a storage area network protocol. At 490, data and application replication and mobility services are performed for data and applications associated with the service flow. At 492, disaster recovery, data decryption, or data decompression services are performed for data and applications associated services with the service flow.

Referring to FIG. 4i, the process 400 continues from FIG. 4a with respect to LAN traffic received from the remote location. At 494, the service flow is processed according to a transport protocol used for transporting the service flow from the remote location. At 496, the service flow is processed according to a local area network extension protocol and, at 498, the service flow is forwarded to a destination within a local area network.

In sum, techniques are provided herein for receiving a service flow at a device in a network. It is determined if the service flow is associated with storage area network traffic or with local area network traffic. In response to determining that the service flow is storage area network traffic, storage area network extension services are performed with respect to the service flow in order to extend the storage area network on behalf of a remote location. In response to determining that the service flow is local area network traffic, local area network extension services are performed with respect to the service flow in order to extend the local area network on behalf of the remote location. The service flows may flow to and from the associated LAN or SAN.

In addition, an apparatus is provided comprising a network interface configured to receive a service flow, and a processor. The processor is configured to: determine if the service flow is associated with storage area network traffic or local area network traffic; in response to determining that the service flow is storage area network traffic, perform storage area network extension services with respect to the service flow in order to extend the storage area network on behalf of a remote location; and in response to determining that the service flow is local area network traffic, perform local area network extension services with respect to the service flow in order to extend the local area network on behalf of the remote location.

Moreover, one or more computer readable storage media encoded with software comprising computer executable instructions and when the software is executed operable to: receive a service flow; determine if the service flow is associated with storage area network traffic or local area network traffic; in response to determining that the service flow is storage area network traffic, perform storage area network extension services with respect to the service flow in order to extend the storage area network on behalf of a remote location; and in response to determining that the service flow is local area network traffic, perform local area network extension services with respect to the service flow in order to extend the local area network on behalf of the remote location.

The techniques described herein vastly reduce the operational steps required to manage a data center when integrating SAN and LAN extension services, i.e., data center management for SAN and LAN extension services is collapsed to the WAN edge device. In addition, a high availability (HA) solution or redundancy is achieved with two LAN/SAN extension line cards instead of the four that would normally be required, i.e., separate redundant line cards would each normally be required for LAN extension and SAN extension.

The above description is intended by way of example only.

What is claimed is:

1. A method comprising:
   at a line card in a network, receiving a service flow in a form of frames of digital data;
   determining if the service flow is associated with storage area network traffic or local area network traffic by analyzing a frame of the service flow;
   in response to determining that the service flow is associated with storage area network traffic, performing storage area network extension services at the line card with respect to the service flow to transfer data contained in the service flow over a wide area network by encapsulating native Fiber Channel traffic for transport over the wide area network in order to extend a storage area network on behalf of a remote location; and
   in response to determining that the service flow is associated with local area network traffic, performing local area network extension services at the line card with respect to the service flow by preparing locally generated local area network traffic for transport using one or more local area network extension protocols to provide data center interconnect capability over a wide area network, with respect to the service flow, in order to extend a local area network on behalf of the remote location,
   wherein performing storage area network extension services comprises:
      performing data and application replication and mobility services for data and applications associated with the service flow;
      performing one or more of disaster recovery, data throughput acceleration, data encryption, and data compression services for data and applications associated services with the service flow; and
      encapsulating the service flow using a storage area network protocol, and
   wherein performing local area network extension services comprises:
      processing the service flow according to a local area network extension protocol based on a transport mechanism used for forwarding the service flow to the remote location;
      encapsulating the service flow into packets based on the transport mechanism; and
      forwarding the packets to the remote location based on a corresponding forwarding mechanism.

2. The method of claim 1, further comprising:
   obtaining the frame from the service flow;
   classifying the frame according to a predefined policy; and
   dropping the frame, encrypting and forwarding the frame, or forwarding the frame without encryption based on the classifying.

3. The method of claim 1, wherein performing storage area network extension services comprises:
performing a destination address lookup; writing the destination address in a frame header associated with the service flow; and forwarding the service flow to the remote location.

4. The method of claim 1, wherein performing local area network extension services comprises:
providing a multi-level traffic management framework comprising at least a physical level, a logical level, and a class level; and
performing traffic management functions for the service flow at each level comprising one or more of QoS classification, traffic metering, traffic marking, congestion management, and traffic conditioning.

5. The method of claim 1, wherein receiving comprises receiving the service flow from the remote location, and wherein performing storage area network extension services comprises:
performing a destination address lookup;
writing the destination address in a frame header associated with the service flow; and
forwarding the service flow to a destination within the storage area network based on the destination address.

6. The method of claim 5, wherein performing storage area network extension services comprises:
decapsulating the service flow using a storage area network protocol;
performing data and application replication and mobility services for data and applications associated with the service flow; and
performing one or more of disaster recovery, data decryption, and data decompression services for data and applications associated services with the service flow.

7. The method of claim 1, wherein receiving comprises receiving the service flow from the remote location, and wherein performing local area network extension services comprises:
processing the service flow according to a transport protocol used for transporting the service flow from the remote location;
processing the service flow according to a local area network extension protocol; and
forwarding the service flow to a destination within a local area network.

8. An apparatus comprising:
a network interface to receive a service flow in a form of frames of digital data; and
a processor to:
determine if the service flow is associated with storage area network traffic or local area network traffic by analyzing a frame of the service flow;
in response to determining that the service flow is associated with storage area network traffic, perform storage area network extension services at a line card with respect to the service flow to transfer data contained in the service flow over a wide area network by encapsulating native Fiber Channel traffic for transport over the wide area network in order to extend a storage area network on behalf of a remote location; and
in response to determining that the service flow is associated with local area network traffic, perform local area network extension services at the line card with respect to the service flow by preparing locally generated local area network traffic for transport using one or more local area network extension protocols to provide data center interconnect capability over a wide area network, with respect to the service flow, in order to extend a local area network on behalf of the remote location,
wherein in performing storage area network extension services, the processor:
performs data and application replication and mobility services for data and applications associated with the service flow;
performs one or more of disaster recovery, data throughput acceleration, data encryption, and data compression services for data and applications associated services with the service flow; and
encapsulates the service flow using a storage area network protocol, and
wherein in performing local area network extension services, the processor:
processes the service flow according to a local area network extension protocol based on a transport mechanism used for forwarding the service flow to the remote location;
encapsulates the service flow into packets based on the transport mechanism; and
forwards the packets to the remote location based on a corresponding forwarding mechanism.

9. The apparatus of claim 8, wherein the processor is further configured to:
obtain the frame from the service flow;
classify the frame according to a predefined policy; and
drop the frame, encrypt and forward the frame, or forward the frame without encryption based on the classifying.

10. The apparatus of claim 8, wherein in performing storage area network extension services, the processor is configured to:
perform a destination address lookup;
write the destination address in a frame header associated with the service flow; and
forward the service flow to the remote location.

11. The apparatus of claim 8, wherein in performing local area network extension services, the processor is configured to:
provide a multi-level traffic management framework comprising at least a physical level, a logical level, and a class level; and
perform traffic management functions for the service flow at each level comprising one or more of QoS classification, traffic metering, traffic marking, congestion management, and traffic conditioning.

12. The apparatus of claim 8, wherein the network interface is configured to receive the service flow from the remote location, and wherein in performing storage area network extension services, the processor is configured to:
perform a destination address lookup;
write the destination address in a frame header associated with the service flow; and
forward the service flow to a destination within the storage area network based on the destination address.

13. The apparatus of claim 12, wherein in performing storage area network extension services, the processor is configured to:
decapsulate the service flow using a storage area network protocol;
perform data and application replication and mobility services for data and applications associated with the service flow; and
perform one or more of disaster recovery, data decryption, and data decompression services for data and applications associated services with the service flow.

14. The apparatus of claim 8, wherein the network interface is configured to receive the service flow from the remote location, and wherein in performing local area network extension services, the processor is configured to:
- process the service flow according to a transport protocol used for transporting the service flow from the remote location;
- process the service flow according to a local area network extension protocol; and
- forward the service flow to a destination within a local area network.

15. One or more non-transitory computer readable storage media encoded with software comprising computer executable instructions and when the software is executed operable to:
- receive a service flow at a line card in a form of frames of digital data; determine if the service flow is associated with storage area network traffic or local area network traffic by analyzing a frame of the service flow;
- in response to determining that the service flow is associated with storage area network traffic, perform storage area network extension services at the line card with respect to the service flow to transfer data contained in the service flow over a wide area network by encapsulating Fiber Channel traffic for transport over the wide area network in order to extend a storage area network on behalf of a remote location; and
- in response to determining that the service flow is associated with local area network traffic, perform local area network extension services at the line card with respect to the service flow by preparing locally generated local area network traffic for transport using one or more local area network extension protocols to provide data center interconnect capability over a wide area network, with respect to the service flow in order to extend a local area network on behalf of the remote location, wherein the instructions that are operable to perform storage area network extension services comprise instructions that are operable to:
- perform data and application replication and mobility services for data and applications associated with the service flow;
- perform one or more of disaster recovery, data throughput acceleration, data encryption, and data compression services for data and applications associated services with the service flow; and
- encapsulate the service flow using a storage area network protocol, and wherein the instructions that are operable to perform local area network extension services comprise instructions that are operable to:
- process the service flow according to a local area network extension protocol based on a transport mechanism used for forwarding the service flow to the remote location;
- encapsulate the service flow into packets based on the transport mechanism; and
- forward the packets to the remote location based on a corresponding forwarding mechanism.

16. The computer readable storage media of claim 15, further encoded with software comprising computer executable instructions and when the software is executed operable to:
- obtain the frame from the service flow;
- classify the frame according to a predefined policy; and
- drop the frame, encrypt and forward the frame, or forward the frame without encryption based on the classifying.

17. The computer readable storage media of claim 15, wherein the instructions that are operable to perform storage area network extension services comprise instructions that are operable to:
- perform a destination address lookup;
- write the destination address in a frame header associated with the service flow; and
- forward the service flow to the remote location.

18. The computer readable storage media of claim 15, wherein the instructions that are operable to perform local area network extension services comprise instructions that are operable to:
- provide a multi-level traffic management framework comprising at least a physical level, a logical level, and a class level; and
- perform traffic management functions for the service flow at each level comprising one or more of QoS classification, traffic metering, traffic marking, congestion management, and traffic conditioning.

\* \* \* \* \*